(12) United States Patent
Hermanek

(10) Patent No.: US 6,410,159 B1
(45) Date of Patent: Jun. 25, 2002

(54) SELF-BONDING MCRALY POWDER

(75) Inventor: Frank J. Hermanek, Indianapolis, IN (US)

(73) Assignee: Praxair S. T. Technology, Inc., North Haven, CT (US)

(*) Notice: Subject to any disclaimer, the term of this patent is extended or adjusted under 35 U.S.C. 154(b) by 0 days.

(21) Appl. No.: 09/430,310

(22) Filed: Oct. 29, 1999

(51) Int. Cl.⁷ .................................................. B22F 1/00
(52) U.S. Cl. ....................... 428/570; 428/553; 428/668; 428/678; 428/679; 428/680; 427/456; 416/241 R; 415/173.4; 415/174.4
(58) Field of Search .................................. 428/570, 553, 428/937, 668, 678, 679, 680; 427/456; 416/241 R; 415/173.4, 174.4

(56) References Cited

U.S. PATENT DOCUMENTS

| | | | |
|---|---|---|---|
| 3,084,064 A | 4/1963 | Cowden et al. ................ | 117/71 |
| 3,322,515 A | 5/1967 | Dittrich et al. ............. | 29/191.2 |
| 3,436,248 A | 4/1969 | Dittrich et al. ............. | 117/105 |
| 3,841,901 A | 10/1974 | Novinski et al. ........ | 117/105.2 |
| 4,019,875 A | 4/1977 | Dittrich et al. ............. | 428/570 |
| 4,181,525 A | 1/1980 | Novinksi ..................... | 75/255 |
| 4,291,089 A | 9/1981 | Adamovic ................... | 428/325 |
| 4,313,760 A | 2/1982 | Dardi et al. ................ | 106/1.12 |
| 4,578,115 A | * 3/1986 | Harrington et al. ........... | 75/255 |
| 5,385,789 A | 1/1995 | Rangaswamy et al. ..... | 428/570 |
| 5,631,044 A | * 5/1997 | Rangaswamy et al. ..... | 427/216 |

FOREIGN PATENT DOCUMENTS

GB    2028378    3/1980

* cited by examiner

Primary Examiner—John Sheehan
Assistant Examiner—Andrew L. Oltmans
(74) Attorney, Agent, or Firm—Blake T. Bierderman

(57) ABSTRACT

A material useful for forming high temperature coatings. The material contains a MCrAlY powder wherein M is selected from the group consisting of iron, nickel, cobalt, iron-base alloys, nickel-base alloys and cobalt-base alloys. An aluminum layer coats the powder. The method forms a high temperature coating with the powder. Thermally spraying the MCrAlY powder towards a substrate reacts the aluminum coating with the MCrAlY powder to metallurgically bond the MCrAlY powder and coat the substrate.

11 Claims, 3 Drawing Sheets

SELF-BONDING MCRALY POWDER

TECHNICAL FIELD

This invention relates to the field of high temperature-oxidation resistant alloys. In particular, this invention relates to MCrAlY powders and a method for forming high-temperature oxidation resistant coatings.

BACKGROUND OF THE INVENTION

Manufacturers have used composites consisting of aluminum clad nickel (NiAl) and an 80/20 nickel chromium alloy (NiCrAl) for over thirty (30) years as underlayments or bond coats over which other materials may be thermally sprayed.

Industry, for high temperature applications, utilizes a particular thermal spray system consisting of a metallic underlayment overcoated with a ceramic layer. This coating system is referred to as a "Thermal Barrier Coating" or TBC.

TBCs are thermal insulators that shield the host or substrate material from the hot gases flowing over them. The metallic underlayment or bond coat is a derivative family of alloys described as "MCrAlYs". MCrAlYs are useful because they exhibit excellent resistance to oxidation and hot corrosion. These alloys, where the "M" represents a metal, may be either iron (Fe), nickel (Ni) or cobalt (Co) or alloys thereof such as iron-base alloys, nickel-base alloys and cobalt-base alloys. They are generically referred to as FeCrAlYs, NiCrAlYs or CoCrAlYs.

When thermally sprayed, as with a plasma or combustion gas apparatus, MCrAlY coatings attach to the host substrate by mechanical means. These coatings form from powders locked or keyed onto asperities previously fashioned onto the substrate surface—they do not metallurgically or chemically attach to the substrate. Manufacturers sometimes rely on a lenghty post-spray, high temperature diffusion cycle to promote adhesive strength. This diffusion treatment provides base metal substrates shielding during environmental exposure. Without diffusion, corrosive media can penetrate the coating.

For example, U.S. Pat. Nos. 3,322,515 and 3,436,246 disclose Ni5Al/NiCr5Al composites that promote coating attachment. These composite materials form metallurgically bonded, or "self-bonded" materials. When exiting a thermal spray device, both materials react exothermically to produce a "superheated" liquid that metallurgically bonds upon impact with a metallic substrate. Unfortunately, both materials lack the long term oxidation and hot corrosion resistance necessary for applications at temperatures above 650° C. (1200° F.).

As noted above, MCrAlYs, by their nature, serve as excellent "barrier/bond" materials in thermal barrier coating (TBC) applications. Commercial applications of these TBCs include use in diesel and gas turbine engines. As "barrier/bond" coats, MCrAlYs provide an "anchorage", or "bond", for subsequent deposits—usually a ceramic coating.

Additionally, the aluminum and chromium constituents form an oxide film or "barrier" that protects the less noble substrate from the hot-corrosive operating environment. If the gases penetrate through to the coating/substrate interface, degradation of the less noble substrate could occur and eventually cause spallation and detachment of the coating. Therefore, a tightly adherent MCrAlY coating would extend a coating's useful service life.

Because of the protective alumina and chromia films that MCrAlYs form, they may be also be used after a diffusion cycle as stand alone coatings. These stand alone coatings provide resistance to both oxidation and hot corrosion attack.

MCrAlY coatings are also useful as "rub tolerant" deposits in gas path seal (dimension or clearance control) systems. Rub-tolerant MCrAlY coatings are used on static components (seal segments) in the turbine section of aero gas turbine engines. During engine operation the rotating, hot blades lengthen and graze the coating. This incursion causes both the MCrAlY and blade tips to smear. The coating is gouged and blade tips worn, i.e. the blade loses some of its original length. Loss of material from either component increases the distance between them. Increased distances translate to increased airflow and an ultimate loss in engine efficiency. If the MCrAlY seals were abradable rather than rub tolerant, the blade would cut away the abradable material without damaging the blade. Furthermore, the abradable material would maintain tighter tolerances between the blade tips and seal segments. Not only would this enhance engine performance; it would decrease the need for either blade repair or replacement.

For many years, these abradable properties and functions have been sought by the aero and industrial gas turbine industries. For example, U.S. Pat. No. 3,084,064 relies on a mechanical mixture of a metallic component with a softer material, such as, carbon or graphite. The softer component forms a void that contributes to the coatings' abradability. Manufacturers must apply MCrAlYs as dense coatings, however, to reduce corrosive gas infiltration. Furthermore, parametric manipulation to reduce MCrAlY coating density and enhance abradability, results in loose deposits that exhibit both poor adhesion and inadequate cohesion.

It is object of this invention to provide an MCrAlY coating that tightly bonds to its substrate without enduring a high temperature diffusion cycle.

It is a further object of this invention to provide an MCrAlY coating that may serve as a TBC barrier/bond or a stand-alone high temperature oxidation hot corrosion resistant layer.

It is a further object of this invention to provide an abradable MCrAlY coating for clearance control (seal) applications.

SUMMARY OF THE INVENTION

A material useful for forming high temperature coatings The material contains a MCrAlY powder wherein M is selected from the group consisting of iron, nickel, cobalt, iron-base alloys, nickel-base alloys and cobalt-base alloys. An aluminum layer coats the MCrAlY powder.

The method forms a high temperature coating with a MCrAlY powder. The M is selected from the group consisting of iron, nickel, cobalt, iron-base alloys, nickel-base alloys and cobalt-base alloys. An aluminum coating covers each particle of the MCrAlY powder. Thermally spraying the MCrAlY powder towards a substrate reacts the aluminum coating with the MCrAlY powder to metallurgically bond the MCrAlY powder and coat the substrate.

DETAILED DESCRIPTION

Figure 1:
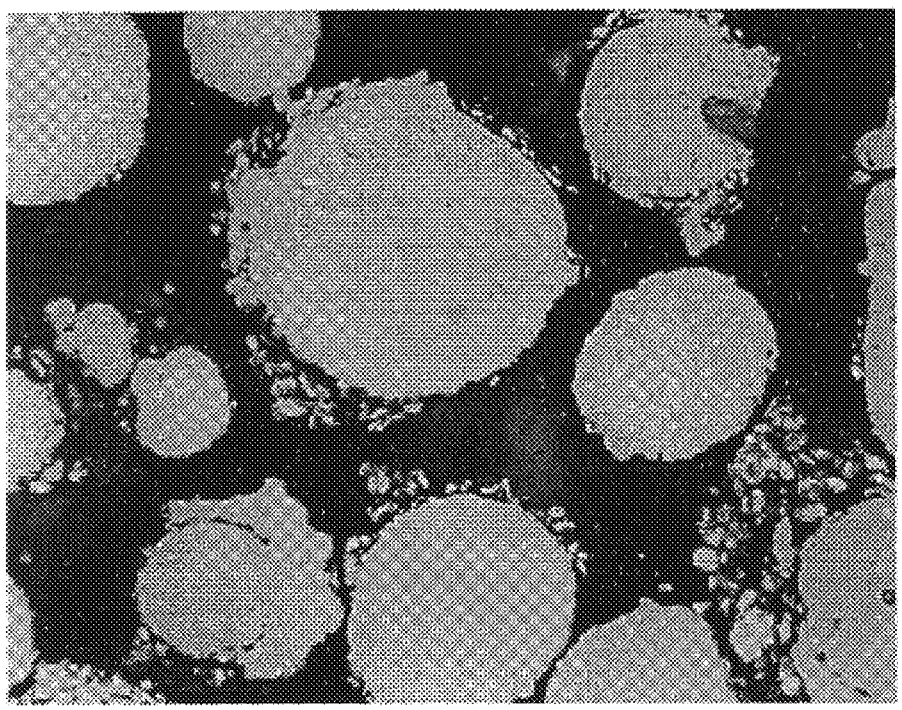
FIG. 1 is a photomicrograph of a cross section of as-polished aluminum-coated MCrAlY core particles coated with an agglomeration of aluminum powder at 500× magnification.

The invention uses aluminum-clad MCrAlYs as either a self-bonding "barrier/bond" coat or as an abradable clearance control coating. As a component of the process, a fine aluminum powder reacts exothermically with a metal oxide to bond the powder. In addition, it has "mated" a complex alloy, the MCrAlY, with aluminum powder or an aluminum coating. When thermally sprayed, the MCrAlY forms a tightly adherent, metallurgically bonded barrier/bond coat for TBCs and other environmental applications. Further, owing to the high temperatures produced during spray, via the exothermic reaction, interparticle welding results. Thus, through selective parametric manipulation, coatings can be applied to a predetermined density (an open or porous structure) yielding a product that exhibits controlled abradability. These porous coatings have a porosity of at least about 5 percent by volume and readily form coatings with porosities between about 5 and 25 percent by volume.

The MCrAlY powder particle (also referred to as "seed" or "core") may be agglomerated or attached to minute aluminum flakes with a binder. Any strong glue, such as animal glue, polyvinyl chloride or phenolic varnish or resin will agglomerate the particles. Optionally the MCrAlY particles may be coated, via diffusion at elevated temperature in an inert gas atmosphere furnace, electrolytic deposition or gaseous decomposition. For example, pack aluminizing or vapor phase sintering at a temperature of about 625 to 675° C. for about 1 to 10 hours is an advantageous process for coating the powder. These diffusion coatings envelope the MCrAlY powder for an effective exothermic reaction.

Electrolytically depositing aluminum includes plating from an inorganic or salt bath onto the MCrAlY core powder particle. For example, it is possible to aluminum coat MCrAlY particles by hydrogen reduction of an ammoniacal solution of nickel and ammonium sulfate. These coating methods however, are anticipated as being much more expensive than either agglomeration or diffusion.

Alloying or increasing the aluminum content of an MCrAlY alloy during initial fabrication will not enable it to react exothermically and be "self-bonding" or to be thermally sprayed into a controlled density, abradable product. The process requires the resulting superheated liquid resulting from the exothermic reaction of aluminum with oxygen to produce metallurgical bonding.

Mechanically blending or mixing an MCrAlY with large aluminum flakes will not produce the results derived from a composite. The exothermic reaction will not occur; and if it did it would be minimal. Further, the resulting coating will exhibit a high volume of free-unreacted aluminum, which will limit the coating's high temperature capability. To react exothermically, the two components must be in intimate contact with each other.

The MCrAlYs most advantageously contain less than about ten weight percent aluminum. The lower aluminum content provides a stronger aluminum gradient and thus a stronger driving force for the exothermic reaction. Alloys especially suited for coating included the following manufactured by Praxair Surface Technologies, Inc. listed in Table I below.

TABLE 1

| Co32Ni21Cr8A10.5Y | PRAXAIR CO-210 |
| Co10Ni25Cr7A10.6Y | PRAXAIR CO-282 |
| Fe30Cr5A10.5Y | PRAXAIR FE-151 |
| Ni23Cr6A10.5Y | PRAXAIR NI-278 |
| Ni20Cr9A10.2Y | PRAXAIR NI-292 |

PRAXAIR is a registered trademark of Praxair Technology, Inc. Note other MCrAlY compositions will perform in a similar manner.

A MCrAlY powder having at least about 1 weight percent aluminum coating provides adequate exothermic energy to metallurgically bond the powder. (This specification refers to coatings as weight percent aluminum coating in relation to the total weight of the MCrAlY powder and the aluminum coating.) But a coating in excess of about 50 weight percent will have diminished high temperature properties. Advantageously, the MCrAlY powder contains about 3 to 30 weight percent aluminum coating. Most advantageously the aluminum coats each MCrAlY particle.

For barrier/bond applications, the MCrAlY powder advantageously contains about 2 to 25 weight percent aluminum coating. Advantageously, it contains about 3 to 20 weight percent aluminum coating for barrier/bond applications requiring high temperature oxidation resistance. Most advantageously, these high temperature MCrAlY powders contain about 4 to 15 weight percent aluminum coating.

For abradable coatings, the powder advantageously contains at least about 5 weight percent aluminum coating for a strong exothermic reaction. Most advantageously, the powder contains about 10 to 50 weight percent aluminum coating for forming abradable MCrAlY coatings.

EXAMPLE 1

A quantity of NI-278 powder was blended with five weight percent three micron aluminum and two weight percent binder. With the core particles having limited surface area and aluminum having its low density, only 4 to 5.5 percent of the aluminum agglomerated with the nickel-base powder. The aluminum was blended with a binder. A binder consisting of a phenolic varnish or resin formed a slurry into which the MCrAlY seeds were added. The total was continually stirred or mixed, as with a typical kitchen/house mixer, until the binder dried or evaporated. The result is agglomerated particles wherein the MCrAlY cores are coated with minute aluminum particles.

The aggregate formed from this union is illustrated in FIG. 1. Several undesirable conditions may be noted in the photomicrograph. In the lower right corner is a large quantity of free aluminum. Free aluminum in an elevated temperature coating is an undesirable condition. Further, not all the particles have aluminum attached to them and those that do exhibit only partial cladding. It is apparent that the morphology of the starting powder is not ideally suited for coating via agglomeration. Smooth, spherical particles are not advantageous for cladding with aluminum flake. Agglomeration methods require complementary powders that combine to form a uniform coating.

EXAMPLE 2

Figure 2:
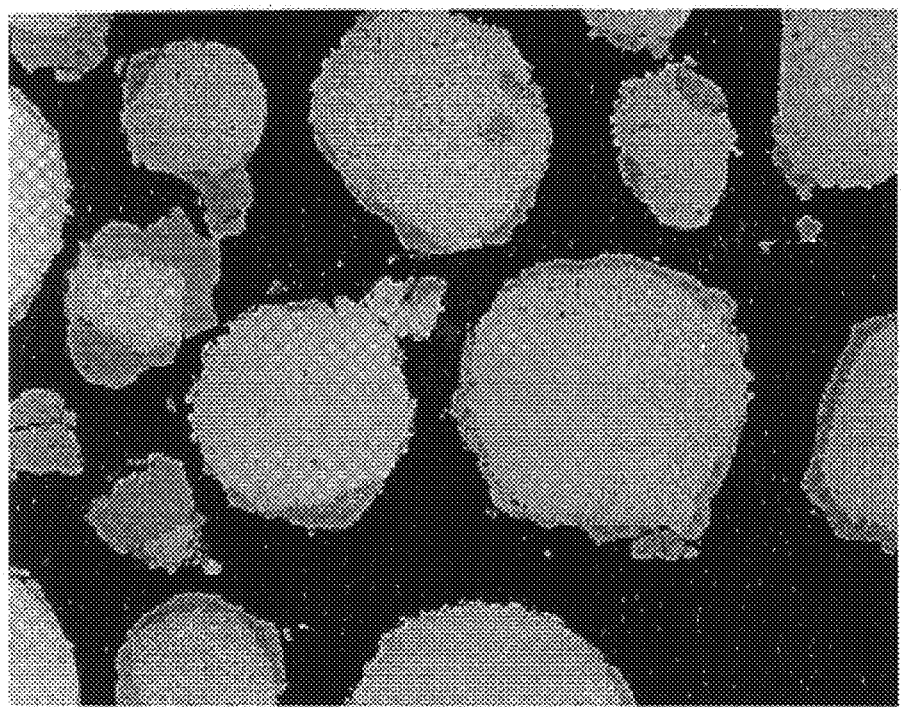
FIG. 2 is a photomicrograph of a cross section of as-polished-aluminum-coated MCrAlY core particles coated with an agglomeration of aluminum powder and sintered at 500× magnification.

A quantity of an MCrAlY and aluminum, sized as noted above, was blended in a 95:5 ratio with the process of Example 1. The blend was deposited into shallow stainless steel trays and furnace sintered for eight (8) hours at 640° C. to 650° C. The furnace atmosphere was argon at a partial pressure of 725 TORR. Other inert or reducing atmospheres however will operate effectively. During the sintering cycle, the aluminum vaporized and condensed onto the surfaces of the MCrAlY seeds. FIG. 2 illustrates the structure of the MCrAlY/aluminum composite powder particles after agglomeration with the above-noted process and sintering.

EXAMPLE 3

Figure 3:
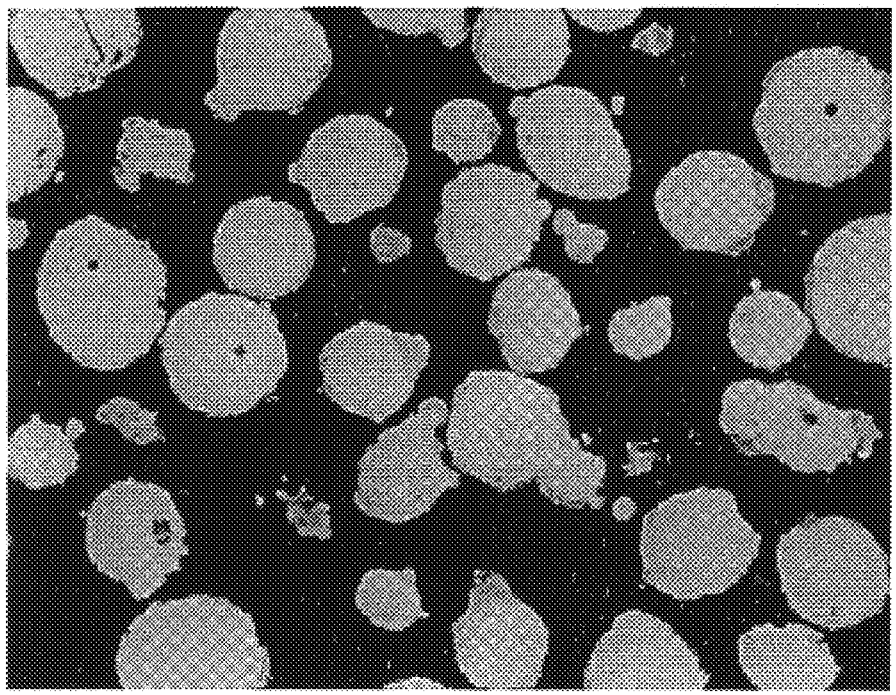
FIG. 3 is a photomicrograph of NiCrAlY powder coated by pack aluminizing at a magnification of 250×.

This demonstrates a "pack aluminizing" or vapor phase sintering process without agglomeration. A blend was made of the aluminum and nickel 278 alloy, placed in a confined box and fired at a temperature of 645° C. (1193° F.) for 8 hours. The aluminum vaporized and condensed on the surface of the adjacent, larger particles. The result was an aluminum clad particle. This technique yielded the NiCrAlY+Al composite powder, identified as NI-833, shown in FIG. 3. Pack aluminizing the NI-278 altered the powder's chemistry and size. Before and after conditions are reported in Tables II and III, respectively.

TABLE II

|  | NI-278 | Al-Clad Powder |
|---|---|---|
| +106 μm | 0 | 0 |
| −106 + 90 μm | 2.58 | 0.02 |
| −90 μm + 75 μm | 12.18 | 9.63 |
| −75 μm + 63 μm | 20.05 | 25.22 |
| −63 μm + 53 μm | 41.04 | 48.99 |
| −53 μm + 45 μm | 20.04 | 15.42 |
| −45 μm + 38 μm | 3.84 | 0.60 |
| −38 μm | 0.27 | 0.12 |

From Table II, it is interesting to note that after aluminizing how the sizing has tightened and reduced the minus 45-micron material to less than one percent.

Table III provides a comparison of powder chemistries prior to and after pack aluminizing.

TABLE III

|  | NI-278 | Al-Clad Powder |
|---|---|---|
| Aluminum | 5.78 | 10.37 |
| Chromium | 22.86 | 21.50 |
| Nickel | 70.60 | 67.60 |
| Yttrium | 0.46 | 0.43 |
| TAO | 0.12 | <0.10 |

The aluminum content of the powder increased 4.59 percent. While this value is lower than the five percent (5%) of aluminum added to the blend the "lost" material may be found lining the walls of the aluminizing confinement box.

Table IV lists Hall flow (per ASTM B213) and apparent densities (per ASTM B212) are found in Table IV.

TABLE IV

|  | NI-278 | Al-Clad Powder |
|---|---|---|
| Flow/50 grams | 16 Seconds | 19 Seconds |
| Density | 3.76 g/cc | 3.36 g/cc |

EXAMPLE 4

Plasma Spraying the Exothermic MCrAlYs. The initial approach in spraying the exothermic MCrAlYs was to use standard 95/5 NiAl parameters. These produce a coating suitable for those applications requiring a "barrier/bond" coat. A "barrier coat" in that it provides the oxidation and hot corrosion protection attributed to a MCrAlY coating. This coating also serves as a "bond coat", performing an anchorage function onto which an overcoat could be secured.

The PRAXAIR SG-100 plasma gun was used for all coating work. Typical operating parameters used for the application of a 95/5 NiAl and the exothermic Al-clad MCrAlY alloy Ni-278 are presented in Table V.

TABLE V

| Anode | 2083-730 |
|---|---|
| Cathode | 2083a-720 |
| Gas Injector | 2083-112 |
| Current | 800 Amps |
| Primary Gas (Ar) | 51.0 l/min |
| Secondary Gas (He) | 42.0 l/min |
| Carrier Gas (Ar) | 4.7 l/min |
| Powder Feed Rate | 36 g/min |
| Spray Distance | 102 mm |

Figure 4:
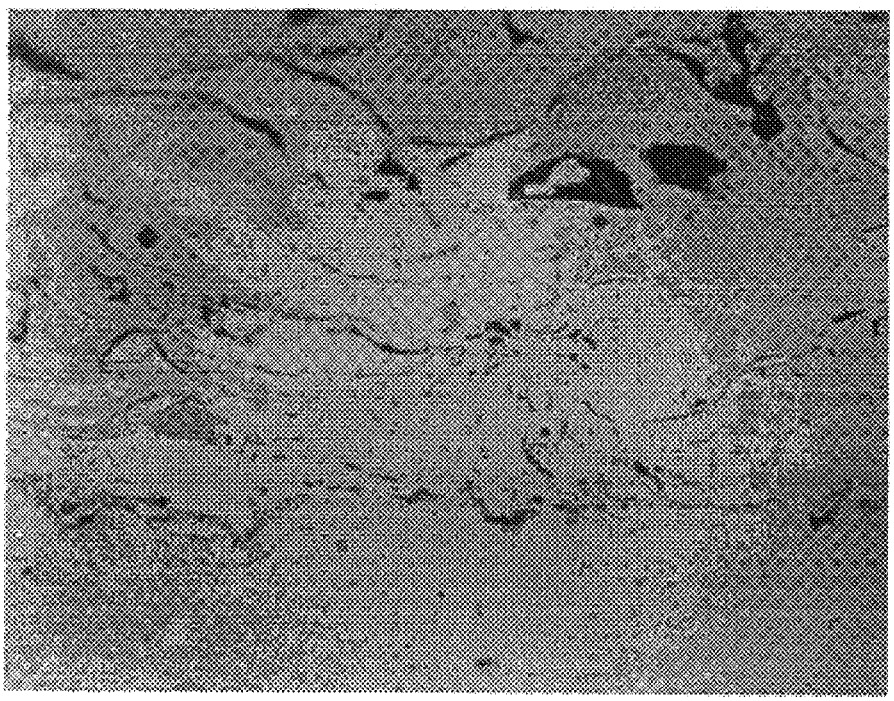
FIG. 4 is a photomicrograph of an interface of barrier/bond coat of NiCrAlY+Al thermal sprayed over a lightly roughened substrate at a magnification of 500×.

The operating conditions noted above produced a dense, well-bonded coating as illustrated in FIG. 4. It should be noted that when sprayed onto a clean, smooth strip of 316 stainless steel, to a thickness of 0.127 mm (0.005 inches) and bent over a 12.7 mm (0.500 inches) radius the coating remains tightly adherent. It neither spalls nor lifts from its substrate. Further, metallographic examination at high magnification has not disclosed evidence of free aluminum as is often found in coatings produced from NiAl agglomerated powders.

Table VI below provides typical properties of Al-clad MCrAlY alloy Ni-278 plasma sprayed as a barrier/bond coat.

TABLE VI

| Porosity | 2 to 3 percent |
|---|---|
| Tensile/bond | 21.72 MPa |
| No surface preparation | (3,150 psi) |
| Tensile/bond | 50.40 MPa |
| On a roughened surface | (7,310 psi) |
| Hardness |  |
| $DPH_{300}$ | 210 |
| HR15T | 84 |
| (HRB Conversion) | (70 to 72) |

EXAMPLE 5

Abradable exothermic Al-clad MCrAlY alloy Ni-278 coatings. In addition to the barrier/bond function the material was sprayed to fabricate a porous, but adherent, deposit. This cohesive structure (particles co-joined) is suitable for use as a high temperature abradable, tip seal coating. The SG-100 was fitted to spray with external powder insertion and using hydrogen as the secondary gas. By empirical means, conditions were identified to apply a low density-adherent coating. The goal was to attain a deposit having porosity within the range of 15 to 20 percent and a Rockwell 15Y hardness of 73±5. It is believed that a coating meeting these criteria should possess excellent rub/abradability characteristics. This is based on the observation that a coating consisting of silicon-aluminum blended with a polyester, having similar properties, performs very well as an abradable, tip seal coating. However, with a melting temperature ranging between 1,234° C. and 2,345° C. (2,253° F.

and 4,253° F.), the exothermically reactive Ni—23Cr—6Al—0.5Y should be suited for service at elevated temperatures. Temperatures, much above the 343° C. (650° F.) of any product containing a polyester. Such a coating is useful for the hot section of a gas turbine engine.

Empirical parameters for the abradable coating are noted below in Table VII.

TABLE VII

| | |
|---|---|
| Anode | 2083-175 |
| Cathode | 2083a-129 |
| Gas Injector | 2083-112 |
| Current | 500 Amps |
| Primary Gas (Ar) | 56.6 l/min |
| Secondary Gas (He) | 6.0 l/min |
| Carrier Gas (Ar) | 4.7 l/min |
| Powder Feed Rate | 91 g/min |
| Spray Distance | 305 min |

The immediate goals relative to hardness and density were achieved. Most advantageously, Rockwell 15Y hardness ranges from about 65 to 85.

Table VIII lists coating mechanical test data with a comparison to the silicon-aluminum/aromatic polyester blend. Additionally, this Table provides erosivity and rub test data.

TABLE VIII

| | SiAl/Polyester | Al Clad NI-278 |
|---|---|---|
| HR15Y | 73± | 74.0 |
| Tensile/Bond | 7.59 MPa | 14.48 MPa |
| Over a bond coat | (1,100 psi) | (2,100 psi) |
| Melting range | 579-621° C. | 1347-1371° C. |
| | (1075-1150° F.) | (2457-2499° F.) |
| Density | | 83.1% |
| Erosivity, wt loss | 0.1545 gm | 0.11817 gm |
| Abradability | 0.488/0 mm | 0.184/0.09 mm |
| | (19.2/0 mils) | (7.23/3.4 mils) |

With respect to this Table, erosivity was conducted by blasting the coating surface with 600 grams of 50 micron alumina at 61 meters/second (200 ft/sec) using a pressure of 172 kPa (25 psi). Abradability was determined by rubbing the coating with a simulated airfoil tip at 1.27 microns/second (0.00005"/sec) to an overall depth of 0.254 mm (0.010 inches). The two combined values represent coating to blade tip wear.

Figure 5:
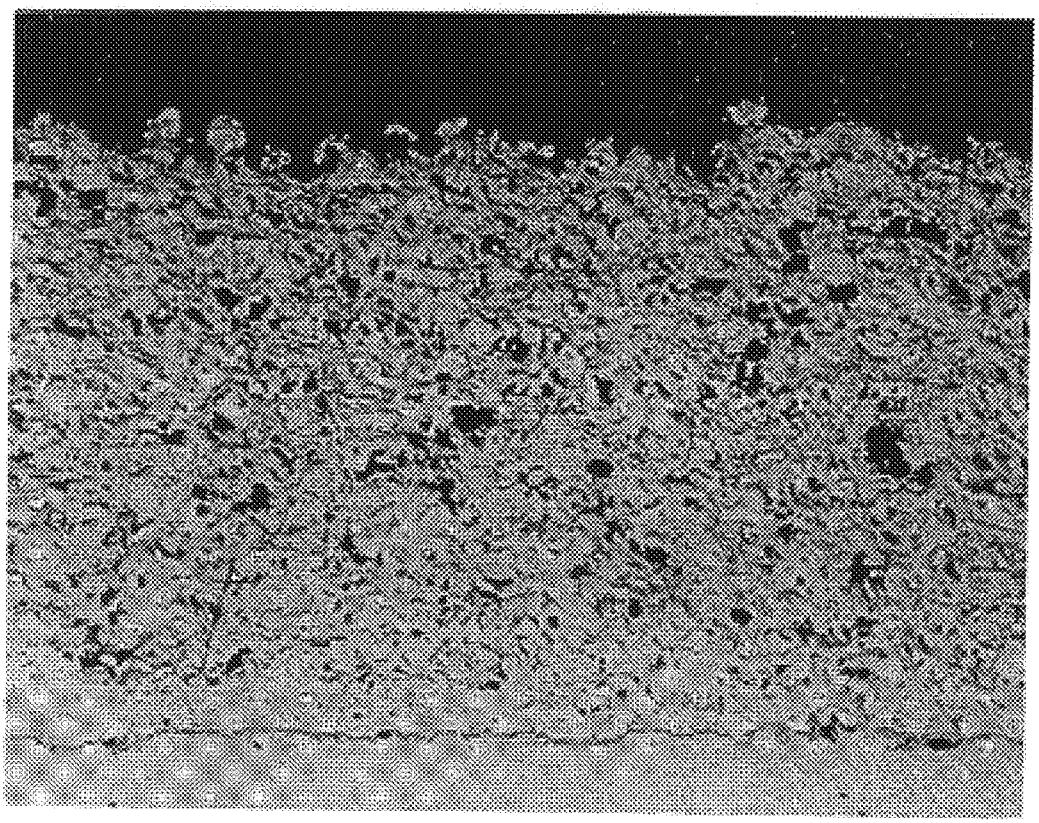
FIG. 5 is a photomicrograph of a duplex exothermic MCrAlY coating consisting of a dense, adherent barrier/bond underlayment overcoated with an open, abradable deposit from NiAlCrY+Al powder at a magnification of 75×.

Coating microstructure is illustrated in FIG. 5, which depicts the dense barrier/bond underlayment adjacent to the substrate and the porous coating immediately above it. Note the uniform distribution of pores and relatively small unmelt content.

The MCrAlY/aluminum composite powders is useful for both manufacturers and users of diesel and gas turbine engines. These applications include power utilities, airlines, the military, overhaul depots, etc. Furthermore, it is also possible that the coating may serve as part of a TBC system or as a high temperature abradable for use in the high pressure turbine section of a jet engine.

Although the invention has been described in detail with reference to a certain preferred embodiment, those skilled in the art will recognize that there are other embodiments of the invention within the spirit and the scope of the claims.

What is claimed is:

1. A gas seal, the gas seal including an abradable coating, the abradable coating having high temperature oxidation resistance and an abradable cohesive structure, the abradable cohesive structure containing interparticle welding of MCrAlY powder, the abradable cohesive structure formed from MCrAlY powder having an aluminum layer coating the MCrAlY powder and wherein M is selected from the group consisting of iron, nickel, cobalt, iron-base alloys, nickel-base alloys and cobalt-base alloys.

2. The gas seal of claim 1 wherein the MCrAlY powder contains less than about 10 weight percent aluminum and the aluminum layer is about 1 to 50 weight percent of a total weight of the MCrAlY powder and the aluminum layer for exothermic reacting and for the interparticle welding of the MCrAlY powder.

3. The gas seal of claim 1 wherein the aluminum layer is about 5 to 50 weight percent of a total of the MCrAlY powder and the aluminum layer for exothermic reacting and for the interparticle welding of the MCrAlY powder.

4. The gas seal of claim 1 wherein the abradable coating has a Rockwell 15Y hardness of about 65 to 85.

5. A gas seal, the gas seal including an abradable coating, the abradable coating having high temperature oxidation resistance and a porous cohesive structure, the porous cohesive structure containing interparticle welding of MCrAlY powder, the porous cohesive structure formed by thermal spraying the MCrAlY powder with an aluminum layer coating the MCrAlY powder and wherein M is selected from the group consisting of iron, nickel, cobalt, iron-base alloys, nickel-base alloys and cobalt-base alloys and the porous cohesive structure has a porosity of at least about 5 volume percent.

6. The gas seal of claim 5 wherein the MCrAlY powder contains less than about 10 weight percent aluminum and the aluminum layer is about 1 to 50 weight percent of a total weight of the MCrAlY powder and the aluminum layer for exothermic reacting and for the interparticle welding of the MCrAlY powder.

7. The gas seal of claim 5 wherein the aluminum layer is about 5 to 50 weight percent of a total of the MCrAlY powder and the aluminum layer for exothermic reacting and for the interparticle welding of the MCrAlY powder.

8. The gas seal of claim 5 wherein the porosity of the porous cohesive structure is about 5 to 25 percent by volume and the abradable coating has a Rockwell 15Y hardness of about 65 to 85.

9. A gas seal, the gas seal including an abradable coating, the abradable coating having high temperature oxidation resistance and a porous cohesive structure, the porous cohesive structure containing interparticle welding of MCrAlY powder, the porous cohesive structure formed by thermal spraying the MCrAlY powder with an aluminum layer coating the MCrAlY powder and wherein M is selected from the group consisting of iron, nickel, cobalt, iron-base alloys, nickel-base alloys and cobalt-base alloys, the MCrAlY powder contains less than about 10 weight percent aluminum, the aluminum layer is about 5 to 50 weight percent of a total weight of the MCrAlY powder and the aluminum layer for exothermic reacting and for the interparticle welding of the MCrAlY powder, and the porous cohesive structure has a porosity of about 5 to 25 volume percent.

10. The gas seal of claim 9 wherein the aluminum layer is about 10 to 50 weight percent of a total of the MCrAlY powder and the aluminum layer for the exothermic reacting and for the interparticle welding of the MCrAlY powder.

11. The gas seal of claim 9 wherein the porous cohesive structure has a Rockwell 15Y hardness of about 65 to 85.

* * * * *